United States Patent [19]

Hayashi et al.

[11] Patent Number: 5,268,407
[45] Date of Patent: Dec. 7, 1993

[54] ELECTRICALLY CONDUCTIVE QUATERNARY AMMONIUM AND METAL SALT COATING COMPOSITION

[75] Inventors: Naohito Hayashi, Aichi; Yuji Kawamura, Inuyama, both of Japan

[73] Assignee: Toagosei Chemical Industry Co., Ltd., Tokyo, Japan

[21] Appl. No.: 910,602

[22] Filed: Jul. 8, 1992

[30] Foreign Application Priority Data

Jul. 9, 1991 [JP] Japan ................................. 3-194805

[51] Int. Cl.$^5$ .......................... C08J 5/10; C08K 5/04; C08K 5/09; C08L 27/00
[52] U.S. Cl. ................................. 524/398; 524/399; 524/400; 524/423; 524/555; 252/519; 252/520; 252/521
[58] Field of Search ....................... 252/519, 520, 521; 524/423, 555, 400, 399, 398

[56] References Cited

U.S. PATENT DOCUMENTS

| | | | |
|---|---|---|---|
| 3,798,032 | 3/1974 | Miller | 96/1.5 |
| 4,256,822 | 3/1981 | Tarumi et al. | 430/62 |
| 4,981,729 | 1/1991 | Zaleski | 427/393.5 |

OTHER PUBLICATIONS

Tappi, vol. 51, No. 12, No. 12, 1968; pp. 552-559.

Primary Examiner—Paul R. Michl
Assistant Examiner—V. K. Rajguru
Attorney, Agent, or Firm—Browdy and Neimark

[57] ABSTRACT

The present invention is an electrically conductive coating composition comprising, as indispensable components, a quaternary ammonium polymer and a polyvalent metal salt. As the quaternary ammonium polymer there can be preferably used a polymer containing at least 30 weight % of quaternary ammonium monomer unit such as 2-methacryloyloxyethyltrimethylammonium chloride or 2-methacryloyloxyethyltrimethylammonium methylsulfate. As the polyvalent metal salt there can be used sulfate, hydrochloride, nitrate or the like of at least one polyvalent metal selected from the group consisting of iron, copper, cobalt, calcium, zinc, lead, nickel, manganese, aluminum, magnesium, titanium, cadmium, chromium, barium and tin. The electrically conductive coating composition of the present invention is extremely excellent in water retention characteristics and therefore has sufficient electric conductivity under circumstances of low humidity even at low coating weight. Thus, according to the present electrically conductive coating composition there can be obtained an electrostatic recording paper which can be used under circumstances of low humidity without thickening the conductive layer.

14 Claims, No Drawings

ELECTRICALLY CONDUCTIVE QUATERNARY AMMONIUM AND METAL SALT COATING COMPOSITION

FIELD OF THE INVENTION

The present invention relates to an electrically conductive coating composition used in the conductive layers of electrophotographic paper, electrostatic recording paper, etc. The electrically conductive coating composition of the present invention has excellent electric conductivity even under circumstances of low humidity, for example, a relative humidity of about 20%.

DESCRIPTION OF RELATED ART

In recent years, with the spread of copying machines, computers, etc., demand for electrophotographic paper and electrostatic recording paper has increased. In particular, electrostatic recording paper enables high-speed printing, saves energy for printing and allows for low-noise printing and hence, it finds wide applications with one of the typical applications being printing in computer graphics.

In electrophotographic paper and electrostatic recording paper, the conductive layer is charged in a pattern such as letters, graph or the like and then the pattern is recorded. The electric conductivity of the conductive layer, i.e., the mobility of electric charges (e.g. ions) is closely related to the high-speed printability of electrostatic recording paper, and a conductive layer of higher electric conductivity provides an electrostatic recording paper of higher performance.

As a material for the conductive layer, there have heretofore been extensively used homopolymers of quaternary ammonium monomers such as 2-methacryloyloxyethyltrimethylammonium chloride, vinylbenzyltrimethylammonium chloride, N-methyl-4-vinylpiperidinium chloride and the like, copolymers between quaternary ammonium monomers and other vinyl monomers, mixtures of these polymers, and so forth [e.g., Tappi, Vol. 51, No. 12, 1968, pages 552–559; Japanese Patent Application Kokai (Laid-Open) No. 65257/1886; Japanese Patent Publication No. 39092/1985].

The above-mentioned conductive layer comprising a quaternary ammonium polymer, poses no problem under ordinary humidity conditions but has insufficient electric conductivity under dry conditions of, for example, a relative humidity of about 20%. This problem of insufficient electric conductivity has heretofore been overcome by making thicker the conductive layer of electrostatic recording paper. A thicker conductive layer, however, invited a new problem that the resulting electrostatic recording paper gives rise to yellowing in a short period of time.

OBJECT AND SUMMARY OF THE INVENTION

It is an object of the present invention to provide an electrically conductive coating composition suitably used in an electrostatic recording paper which has sufficient electric conductivity without thickening the conductive layer and which can be safely used under low humidity conditions.

The present inventors carried out extensive study in order to achieve the above object. As a result, the present invention has been completed.

The present invention resides in an electrically conductive coating composition comprising a quaternary ammonium polymer and a polyvalent metal salt as indispensable components.

The electrically conductive coating composition of the present invention is extremely excellent in water retention characteristics and therefore has sufficient electric conductivity under low humidity conditions even at a low coating weight. Hence, by using the present electrically conductive coating composition there can be obtained an electrostatic recording paper which can be used under low humidity conditions without thickening the conductive layer.

DETAILED DESCRIPTION OF THE INVENTION

The present invention is hereinafter described in more detail.

[Quaternary ammonium polymer]

In the present invention, the quaternary ammonium polymer is a homopolymer or copolymer comprising quaternary ammonium monomers, or a copolymer comprising said quaternary ammonium monomers and other vinyl monomers.

Specific examples of the quaternary ammonium monomers are (1) quaternary ammonium monomers obtained by reacting a dialkylaminoalkylene (meth)acrylate whose alkyl group and alkylene group each have 1–4 carbon atoms, such as dimethylaminoethyl (meth)acrylate, diethylaminoethyl (meth)acrylate, dimethylaminopropyl (meth)acrylate, diethylaminopropyl (meth)acrylate or the like, with a quaternizing agent such as methyl chloride, ethyl chloride, methyl bromide, ethyl bromide, dimethylsulfate, diethylsulfate, benzyl chloride or the like, (2) quaternary ammonium monomers obtained by reacting a dialkylaminoalkylene(meth)acrylamide whose alkyl group and alkylene group each have 1–4 carbon atoms, such as dimethylaminopropyl(meth)acrylamide or the like, with said quaternizing agent, and (3) N-methylvinylpiperidinium halides. These quaternary ammonium monomers can be used alone or in combination of two or more.

Preferable quaternary ammonium monomers are (meth)acrylic acid esters represented by the following general formula (1):

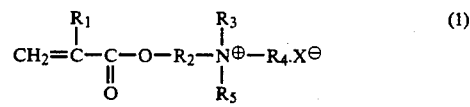

wherein $R_1$ is hydrogen atom or methyl group, $R_2$ is an alkylene group of 1–4 carbon atoms, $R_3$, $R_4$ and $R_5$ are each an alkyl group of 1–4 carbon atoms or benzyl group, and X is chlorine atom, bromine atom, methylsulfate group or ethylsulfate group.

Specific examples of the other vinyl monomers (hereinafter referred to as copolymerizable monomers) to be copolymerized with the quaternary ammonium monomers, are styrene, acrylonitrile, vinyl acetate; alkyl (meth)acrylates such as methyl (meth)acrylate, ethyl (meth)acrylate, butyl (meth)acrylate, 2-ethylhexyl (meth)acrylate and the like; vinylcarboxylic acid monomers such as (meth)acrylic acid, crotonic acid, itaconic acid, maleic acid, fumaric acid and the like; vinylsulfonic acid monomers such as 2-acrylamide-2-methylpropanesulfonic acid, styrenesulfonic acid, (meth)allylsulfonic acid, 2-sulfoethyl (meth)acrylate, 3-sulfopropyl (meth)acrylate and the like; alkali metal salts, ammonium salts, organic amine salts or pyridinium salts of the above vinylcarboxylic acid monomers or vinylsulfonic acid monomers; hydroxyethyl (meth)acrylate, hydroxypropyl (meth)acrylate, (meth)acrylamide, N-methylolacrylamide, diacetonacrylamide, ethylene, propylene, α-methylstyrene, vinyltoluene, ethylene glycol di(meth)acrylate, methylenebisacrylamide and divinylbenzene. These copolymerizable monomers can be used alone or in combination of two or more.

Preferable copolymerizable monomers are styrene, acrylonitrile, vinyl acetate, methyl (meth)acrylate, ethyl (meth)acrylate, butyl (meth)acrylate and 2-ethylhexyl (meth)acrylate. In the present invention, a copolymer between the above quaternary ammonium monomers and the above copolymerizable monomers is preferred.

The ratio of the quaternary ammonium monomer and the copolymerizable monomer to be copolymerized is preferably (quaternary ammonium monomer)/(copolymerizable monomer) = 100−30/0−70 by weight %, more preferably 90-50/10-50 by weight %. When the amount of the quaternary ammonium monomer used is less than 30 weight %, the resulting quaternary ammonium polymer has low electric conductivity.

The quaternary ammonium polymer used in the present invention can be synthesized by, for example, a polymerization process described below.

The above monomer(s) is (are) polymerized at 30°-100° C. using, as the polymerization solvent, water or an aqueous solution containing a lower alcohol (e.g., methyl alcohol, ethyl alcohol, or isopropyl alcohol) and, as the polymerization initiator, 0.05-2.0 parts by weight, per 100 parts by weight of the monomer(s), of ammonium persulfate, potassium persulfate, hydrogen peroxide, 2,2-azobis(2-amidinopropane) hydrochloride, tert-butyl hydroperoxide or the like.

By the above polymerization, there can be obtained a quaternary ammonium polymer ordinarily having a molecular weight of 5,000-1,000,000. For use in the electrically conductive coating composition of the present invention, there is preferred a quaternary ammonium polymer having a molecular weight of 10,000-100,000.

The quaternary ammonium polymer is used as an electrically conductive resin, in the electrically conductive coating composition of the present invention. The quaternary ammonium polymer may be used in combination with another cationic electrically conductive polymer, a nonionic hydrophilic polymer, or the like.

[Polyvalent metal salt]

The electrically conductive coating composition of the present invention comprises the above quaternary ammonium polymer and a polyvalent metal salt described later, as indispensable components. The polyvalent metal salt is used by being dissolved in an aqueous quaternary ammonium polymer solution.

The polyvalent metal salt is preferably a polyvalent metal salt soluble in a weakly acidic aqueous quaternary ammonium polymer solution which ordinarily has a pH of about 4-5. Specific examples of the polyvalent metal salt are sulfates, hydrochlorides, nitrates, borates, acetates, chromates or chlorates of polyvalent metals such as iron, copper, cobalt, calcium, zinc, lead, nickel, manganese, aluminum, magnesium, titanium, cadmium, chromium, barium and tin. Particularly preferable polyvalent metal salts are sulfates, hydrochlorides or nitrates of the above polyvalent metals.

The amount of the polyvalent metal salt in the electrically conductive coating composition is preferably 0.01-10% by weight, more preferably 0.5-5% by weight based on the amount of the resin constituting the electrically conductive coating composition. When the amount is less than 0.01% by weight, the resulting electrically conductive coating composition has inferior electric conductivity at low humidities. When the amount is more than 10% by weight, the composition has inferior storage stability.

[Surfactant]

In the electrically conductive coating composition, a surfactant is preferably used besides the above-mentioned components in order to allow the composition to have improved coatability. The amount of the surfactant used is 0.05-5% by weight, preferably 0.1-1% by weight based on the amount of the resin constituting the composition.

The surfactant includes nonionic surfactants such as polyoxyethylene alkyl ether, sorbitan/fatty acid ester, polyoxyethylene sorbitan/fatty acid ester, glycerine/fatty acid ester, polyoxyethylene alkylamine, polyoxyethylene/fatty acid ester and the like; anionic surfactants such as salt of alkylsulfuric acid, salt of alkylbenzenesulfonic acid, salt of alkylnaphthalene-sulfonic acid, salt of alkylsulfosuccinic acid, salt of alkylphosphoric acid, naphthalenesulfonic acid/formalin condensate, salt of alkyl diphenyl ether disulfonic acid, salt of higher fatty acid, and the like; cationic surfactants such as salt of alkylamine, quaternary ammonium salt, amine oxide and the like; and amphoteric surfactants such as alkylbetaine and the like.

Preferable surfactants are polyoxyethylene alkyl ether, salt of alkylsulfosuccinic acid, salt of alkyl diphenyl ether disulfonic acid, salt of alkylamine, and alkylbetaine.

[Pigment and chelating agent]

In the electrically conductive coating composition, there may be added an appropriate amount of a pigment such as calcium carbonate, kaolin, clay or the like. When such a pigment is added, it is preferable to use, in combination, the following chelating agent in order to improve the dispersibility of the pigment in the composition.

The amount of the chelating agent used is preferably 0.05-10% by weight, more preferably 0.5-5% by weight based on the amount of the resin constituting the electrically conductive coating composition.

As the chelating agent, there can be used ethylenediaminetetraacetic acid, N-hydroxyethylethylenediaminetriacetic acid, nitrilotriacetic acid, gluconic acid, citric acid, malic acid, tartaric acid, lactic acid, pyrophosphoric acid, tripolyphosphoric acid, trimetaphosphoric acid, tetrametaphosphoric acid, hexametaphosphoric acid, salts of the above acids, poly(sodium acrylate), poly(sodium maleate), etc.

Preferable chelating agents are ethylenediaminetetraacetic acid, nitrilotriacetic acid, tartaric acid, gluconic acid, pyrophosphoric acid, salts of the above acids, and poly(sodium acrylate).

DESCRIPTION OF PREFERRED EMBODIMENTS

The present invention is hereinafter described specifically by way of Examples and Comparative Examples.

EXAMPLE 1

To a 1-liter flask were fitted a monomer-inlet tube, a polymerization initiator-inlet tube, a thermometer, a condenser, a nitrogen gas-inlet tube and a stirrer. 394 g of water was fed into the flask. The flask inside was purged with nitrogen gas and the water was heated to 80° C. Then, 400 g of an aqueous solution containing 72% of methacryloyloxyethyltrimethylammonium chloride (hereinafter referred to as DMC) and 28.8 g of an aqueous solution containing 10% of 2,2-azobis(2-amidinopropane) hydrochloride were dropped each in 4 hours from the respective inlet tubes for reaction. After the completion of the dropping, the reaction was continued for an additional 1 hour and terminated to obtain an aqueous solution containing 35% of a polymer.

To 300 g of the 35% aqueous polymer solution were added 1.05 g (1% by weight based on the polymer solid) of aluminum chloride as a polyvalent metal salt, 0.53 g (0.5% by weight based on the polymer solid) of sodium nitrilotriacetate as a chelating agent and 0.11 g (0.1% by weight based on the polymer solid) of sodium dioctylsulfosuccinate as a surfactant to prepare an electrically conductive coating composition (hereinafter referred to simply as conductive composition).

EXAMPLE 2

An aqueous solution containing a copolymer having a composition of DMC/methyl acrylate = 70/30 by weight % was obtained by conducting polymerization according to the same procedure as in Example 1 except that the DMC used in Example 1 was replaced by a DMC/methyl acrylate (7/3 by weight ratio) monomer mixture. To the aqueous copolymer solution was added 1.5% by weight, based on the copolymer solid, of ferrous sulfate to obtain a conductive composition.

EXAMPLE 3

Polymerization was conducted in the same procedure as in Example 1 except that the aqueous DMC solution used in Example 1 was replaced by an aqueous isopropyl alcohol solution containing a 3-(acryloylamino)-propyltrimethylammonium chloride (hereinafter referred to as DMPQ)/vinyl acetate (85/15 weight ratio) monomer mixture. Then, isopropyl alcohol was removed by distillation to obtain an aqueous solution containing a copolymer having a composition of DMPQ/vinyl acetate = 85/15 by weight %.

To the aqueous copolymer solution were added 2% by weight, based on the copolymer solid, of calcium chloride and 1.5% by weight, also based on the copolymer solid, of sodium ethylenediaminetetraacetate to obtain a conductive composition.

EXAMPLE 4

An aqueous solution containing a copolymer having a composition of DMSQ/acrylonitrile = 50/50 by weight % was obtained by conducting polymerization according to the same procedure as in Example 1 except that the DMC solution used in Example 1 was replaced by a methacryloyloxyethyltrimethylammonium methylsulfate (hereinafter referred to as DMSQ)/acrylonitrile (5/5 by weight ratio) monomer mixture.

To the aqueous copolymer solution were added 1% by weight, based on the copolymer solid, of tin chloride and 0.2% by weight, also based on the copolymer solid, of laurin betaine as a surfactant to obtain a conductive composition.

EXAMPLE 5

Polymerization was conducted in the same procedure as in Example 1 except that the aqueous DMC solution used in Example 1 was replaced by an aqueous isopropyl alcohol solution containing a DMC/styrene (90/10 by weight ratio) monomer mixture. Then, isopropyl alcohol was removed by distillation to obtain an aqueous solution containing a copolymer having a composition of DMC/styrene = 90/10 by weight %.

To the aqueous copolymer solution were added 1% by weight, based on the copolymer solid, of zinc sulfate, 0.5% by weight, based on the copolymer solid, of sodium gluconate and 0.2% by weight, based on the copolymer solid, of polyoxyethylene nonyl phenyl ether (HLB = 13.3) to obtain a conductive composition.

COMPARATIVE EXAMPLE 1

The DMC homopolymer produced in Example 1 was used as an electrically conductive coating agent (this agent contained no polyvalent metal salt).

COMPARATIVE EXAMPLE 2

To the aqueous copolymer solution produced in Example 2 was added 1% by weight, based on the copolymer, of lithium chloride. The resulting mixture was used as an electrically conductive coating agent.

[Performance evaluation of conductive compositions]

Each of the conductive compositions obtained in the above Examples and Comparative Examples was diluted with water. Each of the resulting solutions was coated on a wood-free paper using a rod coater so that the coating weight after drying became 2 g/m$^2$. Each coated paper was dried at 130° C. for 1 minute to obtain a paper having a conductive layer on one side. Each of the thus obtained test papers was allowed to stand in a constant-temperature (20° C.) chamber having a humidity shown in Table 1, for 24 hours and then was measured for surface electric resistance, blocking resistance and solvent resistance. The results are shown in Table 1.

The wood-free paper itself (no conductive composition was coated thereon) was subjected to the same measurements, and the results are shown as control (blank) in Table 1.

Performance measurements were made according to the following test methods.

(1) Surface electric resistance

Was measured using a high resistance meter (Model: 4329A manufactured by Yokokawa-Hewlett Packard Co.).

(2) Blocking resistance

Was evaluated by laminating the two same test papers at a relative humidity of 65% so that the respective coated sides faced each other, then allowing the laminate to stand at a pressure of 500 g/cm$^2$ for 24 hours, and examining the peelability of the laminate. In Table 1, ⊚ refers to very good peelability (very good blocking resistance), refers to slightly good peelability, and X refers to poor peelability.

(3) Solvent resistance

The test paper was allowed to stand in a constant-temperature, constant-humidity chamber of 20° C. and 65% humidity for 24 hours. Then, on the coated side of the paper was dropped a drop of dye-containing toluene, and the size of spread of the toluene was examined. In Table 1, ⊙ refers to very good solvent resistance (small spread), ○ refers to slightly good solvent resistance (intermediate spread), and X refers to poor solvent resistance (large spread).

TABLE 1

| | Surface electric resistance at 20° C. (Ω) | | | Blocking resistance | Solvent resistance |
|---|---|---|---|---|---|
| | 20% R.H. | 40% R.H. | 65% R.H. | | |
| Control (blank) | $3.5 \times 10^{12}$ | $5.0 \times 10^{11}$ | $6.7 \times 10^{10}$ | ⊙ | X |
| Example 1 | $5.2 \times 10^{-7}$ | $1.4 \times 10^{-7}$ | $3.8 \times 10^{-6}$ | ○ | ⊙ |
| Example 2 | $6.3 \times 10^{-7}$ | $2.5 \times 10^{-7}$ | $4.9 \times 10^{-6}$ | ⊙ | ⊙ |
| Example 3 | $5.8 \times 10^{-7}$ | $2.1 \times 10^{-7}$ | $4.3 \times 10^{-6}$ | ○ | ⊙ |
| Example 4 | $7.5 \times 10^{-7}$ | $3.1 \times 10^{-7}$ | $5.5 \times 10^{-6}$ | ⊙ | ⊙ |
| Example 5 | $5.5 \times 10^{-7}$ | $2.3 \times 10^{-7}$ | $4.3 \times 10^{-6}$ | ○ | ⊙ |
| Comparative Example 1 | $9.8 \times 10^{-7}$ | $6.1 \times 10^{-7}$ | $8.7 \times 10^{-6}$ | X | ⊙ |
| Comparative Example 2 | $8.8 \times 10^{-7}$ | $4.6 \times 10^{-7}$ | $7.4 \times 10^{-6}$ | ○ | ⊙ |

What is claimed is:

1. An electrically conductive coating for electrophotographic paper or electrostatic recording paper comprising, a quaternary ammonium polymer and a polyvalent metal salt soluble in an aqueous solution of the quaternary ammonium polymer as indispensable components.

2. An electrically conductive coating composition according to claim 1, wherein a quaternary ammonium monomer constituting the quaternary ammonium polymer is a (meth)acrylic acid ester monomer represented by the following general formula (1):

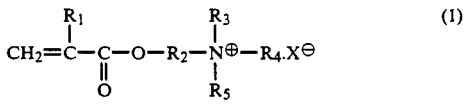

wherein $R_1$ is hydrogen atom or methyl group, $R_2$ is an alkylene group of 1–4 carbon atoms, $R_3$, $R_4$ and $R_5$ are each an alkyl group of 1–4 carbon atoms or benzyl group, and X is chlorine atom, bromine atom, methylsulfate group or ethylsulfate group.

3. An electrically conductive coating composition according to claim 2, wherein the quaternary ammonium polymer is a copolymer consisting of a (meth)acrylic acid ester monomer unit represented by the general formula (1) and another vinyl monomer unit and the proportion of the quaternary ammonium monomer unit is 90–50% by weight based on the total of the monomer units.

4. An electrically conductive coating composition according to any of claim 2, wherein the quaternary ammonium polymer is a copolymer between a (meth)acrylic acid ester monomer represented by the general formula (1) and at least one vinyl monomer selected from the group consisting of methyl (meth)acrylate, ethyl (meth)acrylate, butyl (meth)acrylate, 2-ethylhexyl (meth)acrylate, styrene, acrylonitrile and vinyl acetate.

5. An electrically conductive coating composition according to claim 2, wherein the polyvalent metal salt is a sulfate, hydrochloride or nitrate of at least one polyvalent metal selected from the group consisting of iron, copper, cobalt, calcium, zinc, lead, nickel, manganese, aluminum, magnesium, titanium, cadmium, chromium, barium and tin.

6. An electrically conductive coating composition according to claim 2, wherein the amount of the polyvalent metal salt is 0.01–10% by weight based on the amount of the resin constituting the electrically conductive coating composition.

7. Electrophotographic paper or electrostatic recording paper coated with a thin layer comprising a quaternary ammonium polymer together with a polyvalent metal salt soluble in an aqueous solution of the quaternary ammonium polymer.

8. A paper according to claim 7, wherein said thin layer imparts a coating having a surface electrical resistance of about $5 \times 10^7$ Ω.

9. A paper according to claim 8, wherein said resistance is present in an atmosphere of about 20% relative humidity.

10. A paper according to claim 7, wherein a quaternary ammonium monomer constituting the quaternary ammonium monomer constituting the quaternary ammonium polymer is a (meth)acrylic acid ester monomer represented by the following general formula (1):

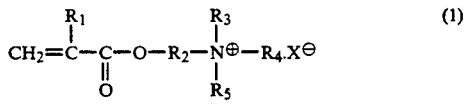

wherein $R_1$ is hydrogen atom or methyl group, $R_2$ is an alkylene group of 1–4 carbon atoms, $R_3$, $R_4$ and $R_5$ are each an alkyl group of 1–4 carbon atoms or benzyl group, and X is chlorine atom, bromine atom, methylsulfate group or ethylsulfate group.

11. A paper according to claim 10, wherein the quaternary ammonium polymer is a copolymer consisting of a (meth)acrylic acid ester monomer unit represented by the general formula (1) and another vinyl monomer unit and the proportion of the quaternary ammonium monomer unit is 90–50% by weight based on the total of the monomer units.

12. A paper according to claim 10, wherein the quaternary ammonium polymer is a copolymer between a (meth)acrylic acid ester monomer represented by the general formula (1) and at least one vinyl monomer selected from the group consisting of methyl (meth)acrylate, ethyl (meth)acrylate, butyl (meth)acrylate, 2-ethylhexyl (meth)acrylate, styrene, acrylonitrile and vinyl acetate.

13. A paper according to claim 10, wherein the polyvalent metal salt is a sulfate, hydrochloride or nitrate or at least one polyvalent metal selected from the group consisting of iron, copper, cobalt, calcium, zinc, lead, nickel, manganese, aluminum, magnesium, titanium, cadmium, chromium, barium and tin.

14. A paper according to claim 10, wherein the amount of the polyvalent metal salt is 0.01–10% by weight based on the amount of the resin constituting the electrically conductive coating composition.

* * * * *